United States Patent [19]

Mumford

[11] Patent Number: 4,478,631

[45] Date of Patent: Oct. 23, 1984

[54] GLASS FEEDER HEAT BAFFLE

[75] Inventor: Eustace H. Mumford, Ottawa Lake, Mich.

[73] Assignee: Owens-Illinois, Inc., Toledo, Ohio

[21] Appl. No.: 482,676

[22] Filed: Apr. 6, 1983

[51] Int. Cl.³ .............................................. C03B 7/08
[52] U.S. Cl. ....................................... 65/327; 65/326; 65/328; 65/330
[58] Field of Search .................. 65/326, 327, 328, 330

[56] References Cited

U.S. PATENT DOCUMENTS

| | | | |
|---|---|---|---|
| 2,654,184 | 10/1953 | Peiler | 65/326 X |
| 3,508,904 | 4/1970 | Keefer | 65/326 |
| 4,328,023 | 5/1982 | Vilk | 65/330 X |

FOREIGN PATENT DOCUMENTS 334213 8/1930 United Kingdom .................. 65/326

Primary Examiner—Arthur Kellogg
Attorney, Agent, or Firm—Gerald T. Welch; Myron E. Click

[57] ABSTRACT

When multiple gob feeders are used in which an enlarged tube is necessary to accommodate a row of plungers, a substantial surface area of glass is exposed to radiation or convection cooling and, to avoid excessive heat loss, a pair of heat baffles are used which extend downward into the tube at either side of the row of plungers. The baffles have lower portions which occupy a significant part of the space between the plungers and tube, and act as barriers against the movement of heat up through the space therebetween. The pair of baffles are so configured that they may be raised from the tube without requiring the removal of the plungers. Further, the baffles are supported in the tube by the tube support and therefore will be raised or lowered with the tube when it is adjusted.

6 Claims, 3 Drawing Figures

GLASS FEEDER HEAT BAFFLE

BACKGROUND OF THE INVENTION

Typical multiple gob glass feeders have reciprocating plungers associated with each feeder orifice and are provided with a circular or cylindrical tube which surrounds the plungers and extends downwardly into the molten glass. The bottom of the tube in cooperation with the upper edge of the orifice in the bottom of the feeder bowl will dictate, to a great extent, the volume of glass which will be held within the tube over the feeder orifices. In these situations the plungers occupy a significant portion of the central part of the feeder tube, however, there is a considerable area at either side of the row of plungers which may be subject to loss of heat from the surface of the glass within the tube by convection and radiation vertically upward from the surface. It has become more advantageous to provide glass melting feeders with more than a single feeder orifice, in order to feed the more advanced glass forming machines which have plural cavity molds, and it is important to conserve as much energy as possible when feeding multiple charges of molten glass simultaneously. This is certainly more important now with the advent of the "quad" or quadruple gob glass forming machine, which is coming to the fore.

With this in view, it is an object of the present invention to provide apparatus for feeding a plurality of charges of molten glass simultaneously through plural feeder orifices in the bottom of the feeder in which each feeder orifice has a vertically-positioned plunger thereabove and, to conserve heat, a heat baffle is provided to block the exiting of heat from the surface of the glass on adjacent sides of the row of plungers associated with the plurality of plunger mechanisms in the typical glass feeder. Glass feeder bowls are of the general configuration of a round-nosed bowl open at one side and into which molten glass is fed from an elongated forehearth. The bottom of the bowl is provided with a generally circular opening, and within this opening is positioned an orifice pan which carries a ceramic orifice member having the desired number of orifices therethrough, corresponding to the number of gobs which it is to produce simultaneously for the glass forming machine. In the present case, the feeder is for providing 4 gobs or charges of molten glass simultaneously to be delivered to a plural section glass forming machine. In view of the fact these feeder bowls are elevated some 10-15 feet above the level of the floor on which the forming machine will be resting, the charges or gobs are delivered by gravity.

SUMMARY OF THE INVENTION

An improved glass feeder in which a feeder bowl having a cylindrical tube extending vertically downward thereinto with a row of plungers extending vertically downward into the feeder bowl positioned inside the tube in linear array wherein the improvement involves the use of a pair of heat baffles which are positioned within the tube at either side of the row of the plungers and act as barriers against the movement of heat upwardly through the space between the tube and the plungers.

DETAILED DESCRIPTION OF THE DRAWINGS

Figure 1:
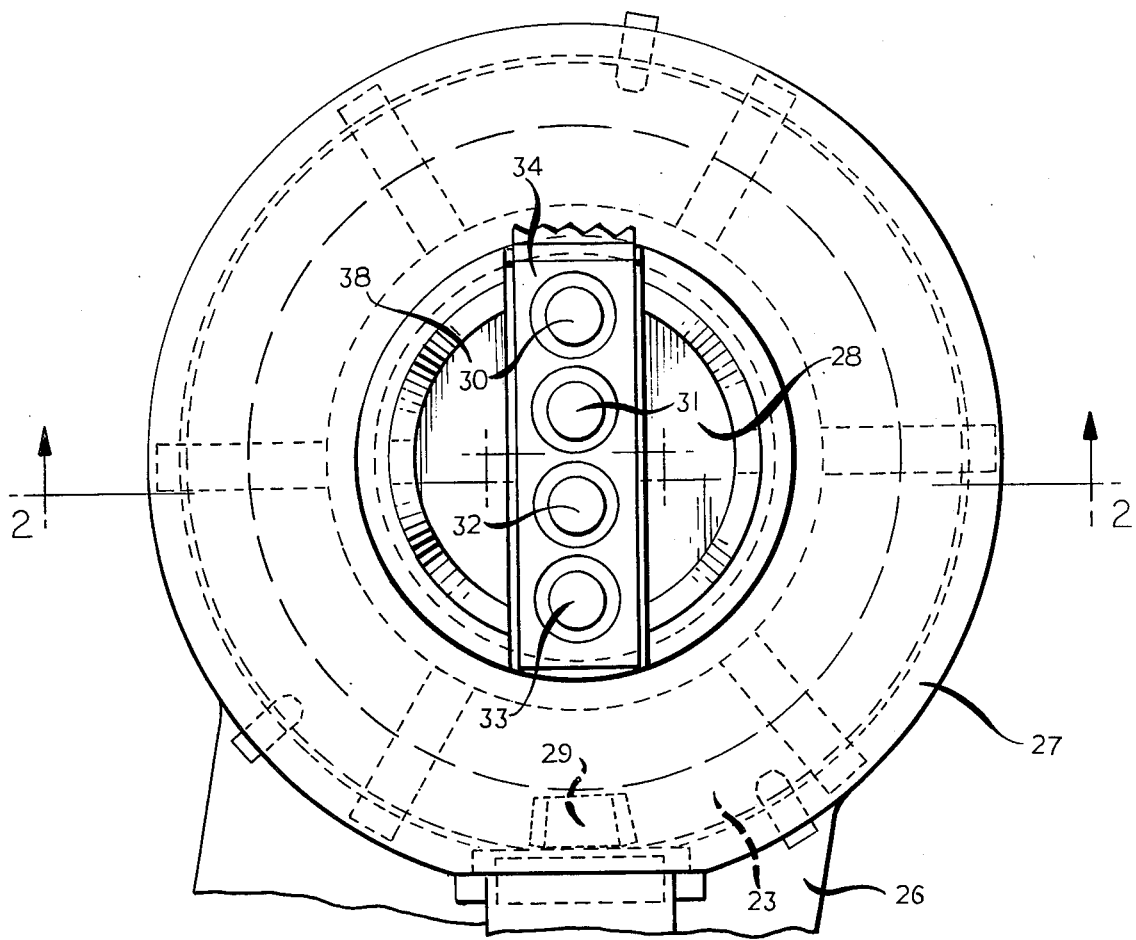
FIG. 1 is a top plan view of a feeder tube and support with the heat baffles of the invention positioned therein.
Figure 2:
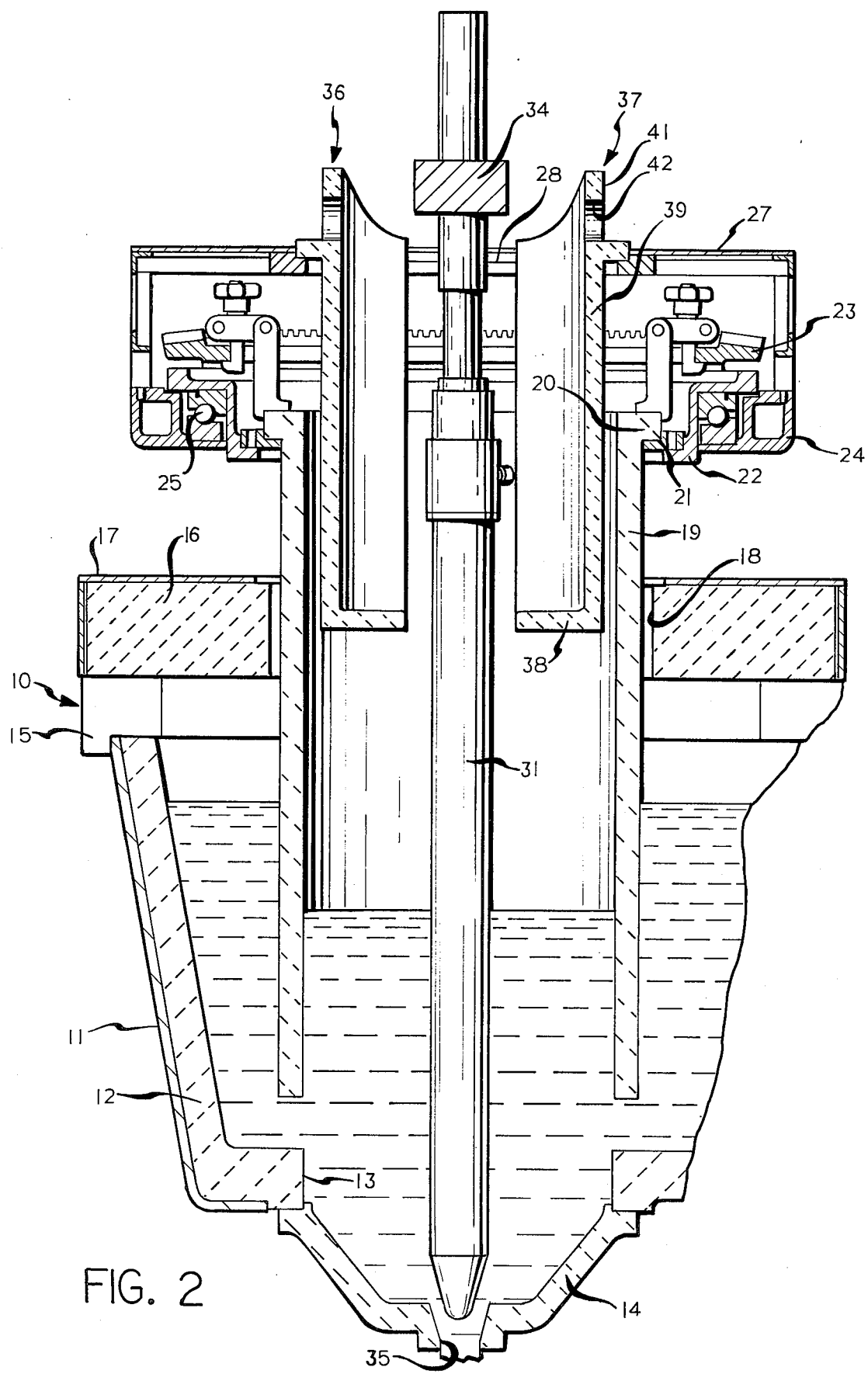
FIG. 2 is a cross-sectional view taken on line 2—2 of FIG. 1 and, in addition, showing a sectional view through the associated feeder bowl.
Figure 3:
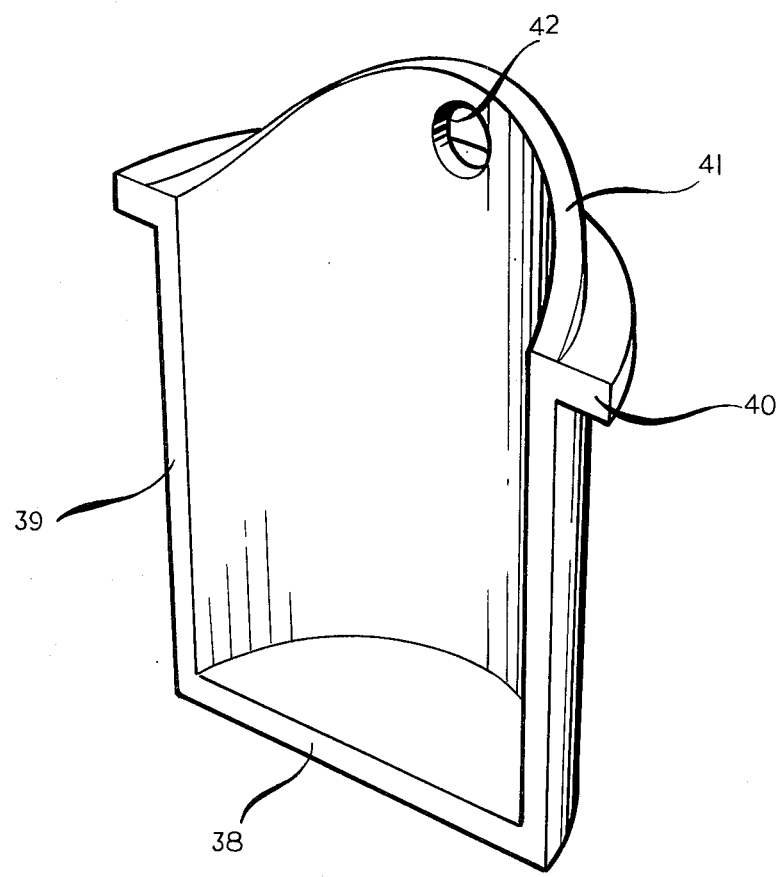
FIG. 3 is a perspective view of one of the heat baffles of the invention.

With reference to the accompanying drawings, and in particular to FIGS. 1 and 2, the present invention may be seen in the environment of the generally typical glass feeder. Glass feeders typically are positioned at the end of a forehearth and take the form of a bowl, only the cross-sectional view of such a bowl being shown in FIG. 2 and generally designated 10. The bowl 10 consists of a metal bowl-like member 11 lined with a refractory material 12. The refractory material 12 has an opening 13 formed in the bottom thereof, this opening being closed by a ceramic orifice member 14. The upper edge of the metal bowl is surrounded by a refractory ring 15, and covering the ring and a significant portion of the top of the bowl is a refractory member 16 having a metal covering 17 therearound. The cover 16 is provided with a circular opening 18. The opening 18 is in vertical alignment with the opening 13 and of somewhat greater diameter so as to accommodate a vertically-positioned tube 19. The tube 19 also is formed of ceramic or refractory material, inasmuch as its lower end is to be immersed in molten glass as shown in FIG. 2. The tube 19 is formed with an upper annular supporting rim portion 20, which is supported by a flange 21 carried by a metal ring 22. The metal ring 22 is the lower supporting portion of a ring gear 23. The ring 22 is mounted for rotation relative to a stationary supporting member 24 by suitable bearings 25. The support 24 is generally cylindrical, however it has a main support beam portion 26 as shown in FIG. 1, which extends away from the area of the tube. The beam 26 serves to support the tube mounting member 24 and ring gear 23. The metallic cover 27 overlies the ring gear 23. The cover 27 is circular and also provided with opening 28. The opening 28 is coaxial with respect to the tube 19 and the opening 13 in the bottom of the feeder bowl.

In the normal operation of the feeder, the tube 19 is rotated about its vertical axis at a predetermined rotational velocity, rotation being affected by a beveled gear 29, as shown in FIG. 1, inmesh with the ring gear 23. Within the tube 19 are positioned four vertical needle plungers 30–33. The plungers 30–33 are supported by a common bar 34, which in turn is supported by a mechanism (not shown), but as is conventional, the mechanism which carries the bar 34, in normal operation, will vertically reciprocate the bar 34 and all of the plungers. It should be noted that the plungers are in vertical alignment with, and operate in conjunction with four individual orifice openings, only one of which is shown in conjunction with the plunger 31. Orifice openings 35 are provided in the orifice member 14. Through the advent of the vertical movement of the plunger 31, glass issues through the orifice openings 35 and are, through shear mechanism, severed into gobs or mold charges.

The space between the row of plungers 30–33 and the tube 19 serves to be a relatively large area, particularly in the situation of the present invention, where four plungers occupy the central area leaving considerable surface area of the glass within the tube exposed to convection and radiation vertically upward out of the center of the tube 19. In order to prevent as much heat loss as possible, it is desirable to provide a heat baffle for this area which does not require removal of the plungers when being moved or lifted from the tube. The removal of the plungers was necessary in the past when the baffles were made of a single member.

The cover 27, as previously explained, is provided with a central opening therethrough. Within this central opening is supported a pair of semicircular heat baffles generally designated 36 and 37. Each baffle has a generally horizontal lower portion 38, a semi-cylindrical vertical wall portion 39, with an annular flange 40 and a vertical extension 41 of the wall portion 39 which extends above the annular flange 40. The vertical extension 41 is provided with an opening 42 therethrough. This opening 42 serves as a means by which a hook of a lifting device may be used when the baffle is to be lifted out of the center of the tube.

In glass plants, typically the heavier mechanisms, and particularly those which are found in the feeder area and forehearth area of the plant, are lifted and moved by overhead hoists with block and tackle mechanisms. In the operation of the invention, it can be noted that tube 19, when in use, is continuously rotating about its vertical axis, and also is vertically adjustable relative to the bottom of the feeder bowl. Inasmuch as the heat baffles 36 and 37 are supported by the tube-supporting and rotating mechanism, vertical adjustment of the tube may be effected without disturbing the relative relationship of the heat baffles 36 and 37 with the tube. Furthermore, such adjustment can be made without interfering with the operation of the plungers 31 which are also, in normal operation, vertically reciprocated during each cycle of the feeding of gobs. When heat baffles, which were made of ceramic material and made in one piece, were used with single or double operation, they could be adequately supported without interference with the plunger. In the present invention, where four plungers occupy nearly all of the room in the center of the tube and leave only sectors of a circle at each side, it is important that the baffles may be removed or shifted without disturbing the positioning of the plungers 30-33.

What I claim is:

1. An improved glass feeder including a feeder bowl having a cylindrical tube extending vertically downward into the feeder bowl with means to support the tube for rotation about its vertical axis, a row of plungers extending vertically downward into the feeder bowl and positioned inside said tube for controlling the flow of glass from orifices in the bottom of the bowl, the improvement therein including a pair of heat baffles extending downward into the tube at either side of the row of plungers and occupying a sufficient portion of the space therebetween, to act as a barrier against the movement of heat up through the space between the tube and plungers.

2. The improved feeder of claim 1 further including means for supporting said heat baffle in said tube and means formed in the upper end of said baffles for permitting vertical movement of said baffles out of the tube without removal of the plungers.

3. The improved feeder of claim 2 wherein the means formed in the baffles permitting movement thereof comprises an extension of each baffle above the upper end of the tube and an opening formed in said extension for engagement with a lifting device.

4. The improved glass feeder of claim 1 wherein said baffles are formed with a lower portion that describes the cord of a circle having the vertical axis of the tube as a center with the curved side in juxtaposition to inside circumference of the tube and the straight side in close relationship to the sides of the row of plungers.

5. The improved glass feeder of claim 4 further including an upper rim portion formed on said baffles and means for supporting said baffles by their rims.

6. The improved glass feeder of claim 5 further including an upper extension carried by each baffle above its upper rim, and said extension providing means by which lifting and removing the baffles may be accomplished.

* * * * *